UNITED STATES PATENT OFFICE.

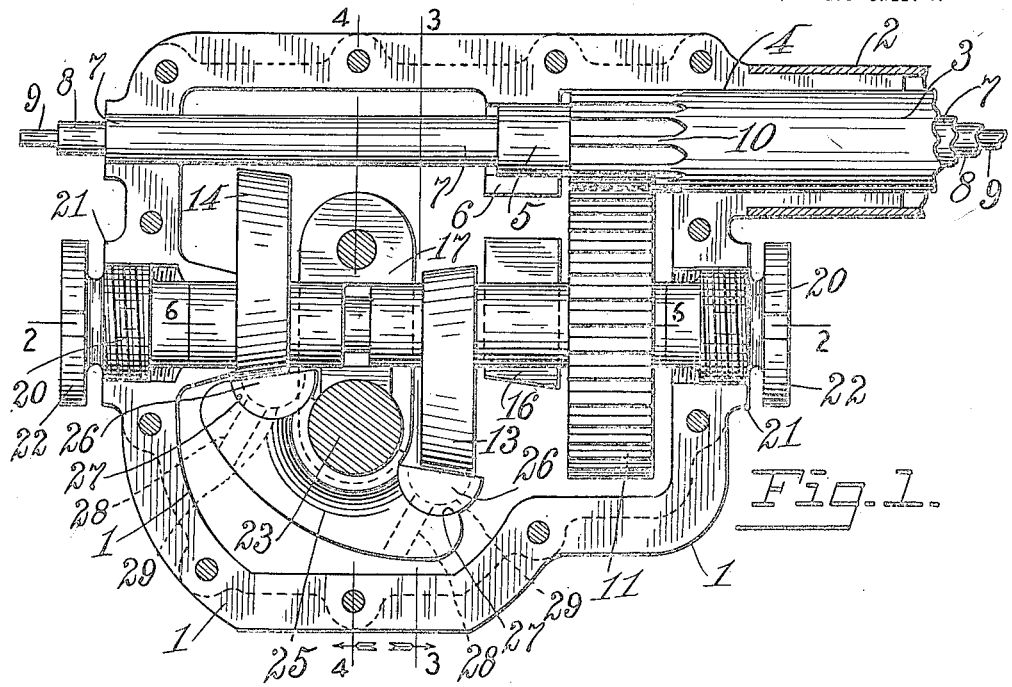
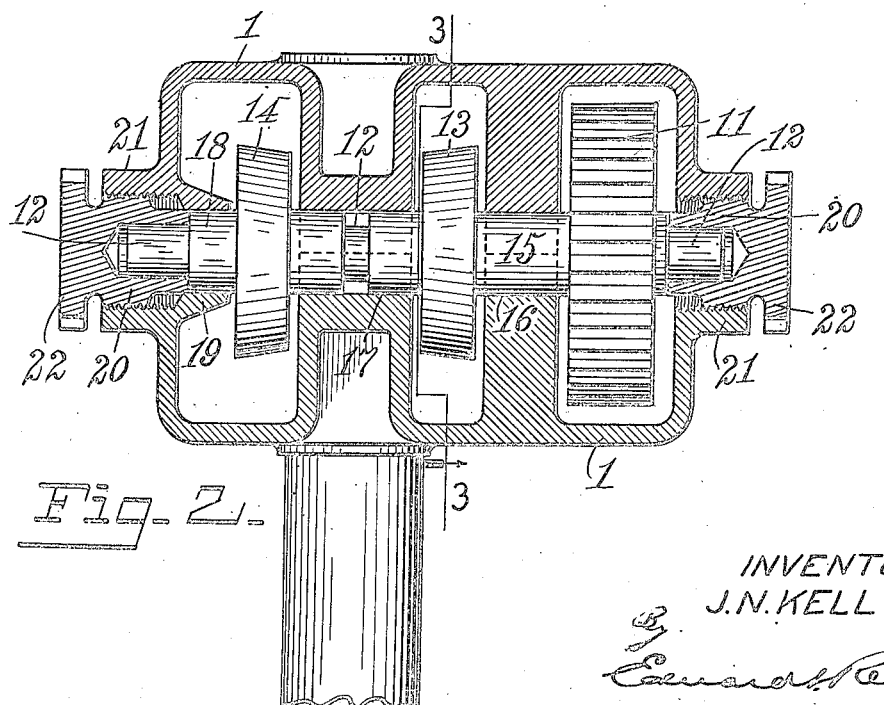

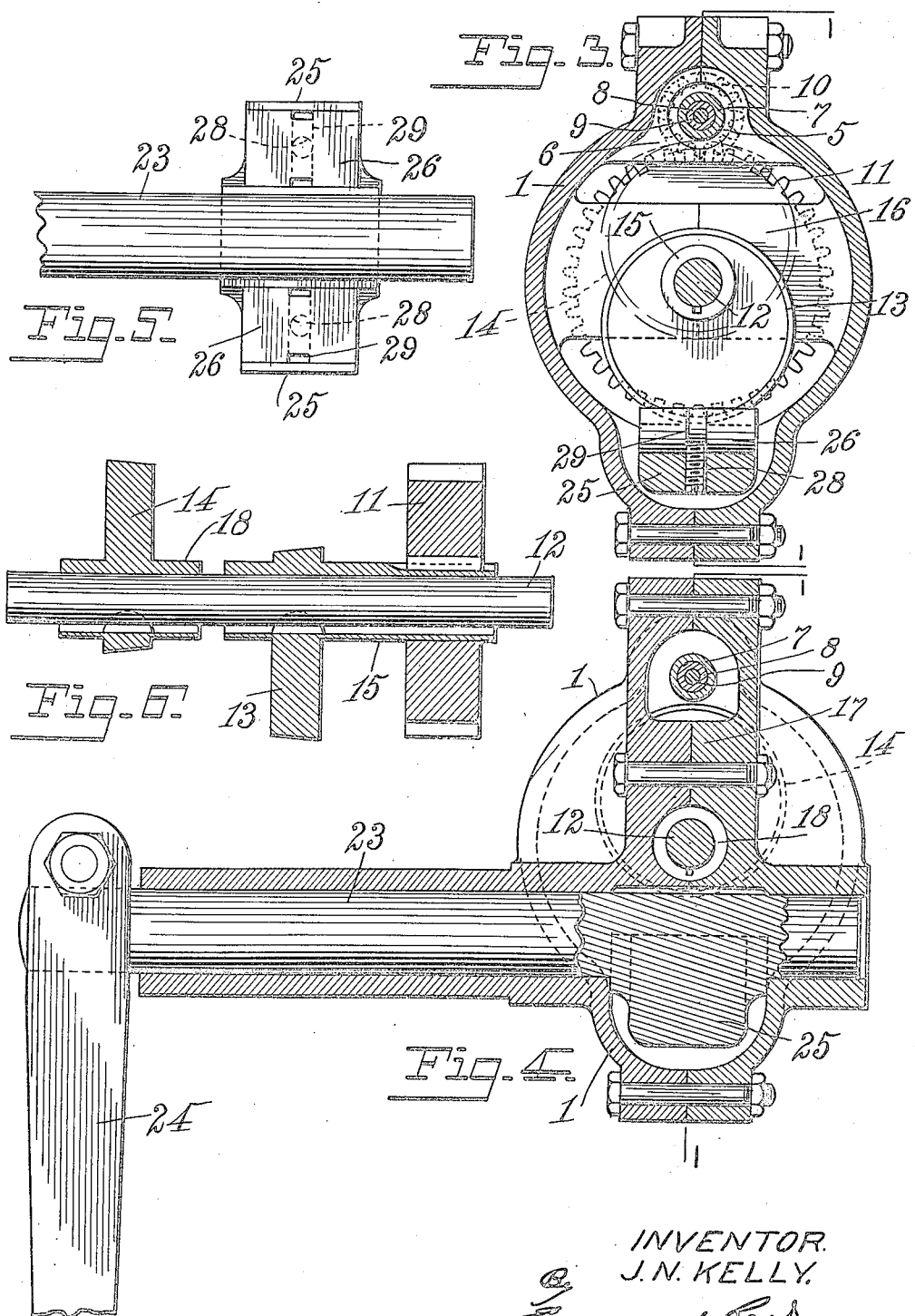

JOSEPH N. KELLY, OF DAYTON, OHIO.

STEERING MECHANISM.

1,386,710.　　　　　Specification of Letters Patent.　　Patented Aug. 9, 1921.

Application filed February 5, 1921. Serial No. 442,714.

*To all whom it may concern:*

Be it known that I, JOSEPH N. KELLY, a citizen of the United States, residing at Dayton, in the county of Montgomery and State of Ohio, have invented certain new and useful Improvements in Steering Mechanism, of which the following is a specification, reference being had therein to the accompanying drawing.

This invention relates to steering mechanism for motor driven vehicles and the like.

One object of the invention is to provide such a steering mechanism which will be simple in construction, of a strong, durable character, and positive in its operation.

A further object of the invention is to provide such a steering mechanism which can be adjusted to maintain a firm operative contact between the coöperating parts thereof.

Other objects of the invention will appear as the device is described in detail.

In the accompanying drawings Figure 1 is a sectional view taken between the two parts of the casing and showing the operating mechanism in elevation; Fig. 2 is a section taken on the line 2—2 of Fig. 1; Fig. 3 is a transverse section taken on the line 3—3 of Fig. 1; Fig. 4 is a transverse section taken on the line 4—4 of Fig. 1; Fig. 5 is a plan view of the rocker arm; and Fig. 6 is a sectional view of the parts mounted on the main shaft, taken on the line 6—6 of Fig. 2.

In these drawings I have illustrated one embodiment of my invention, and have shown the several parts thereof as mounted within a case 1 which constitutes a main frame, the two parts of which can be separated to permit access to the interior mechanism and then connected one to the other to form an oil tight casing. The shape and character of this casing may, of course, be varied to accommodate the same to varying conditions. As here shown, a steering post 2 is mounted on one end of the casing and a steering shaft 3, which is arranged within the post, is journaled in a suitable bearing 4 on the main casing. Preferably the inner end of the steering shaft is reduced, as shown at 5, and journaled in the bearing 6, also formed in the main casing. Mounted within the steering shaft, which is hollow, is an anchor tube 7 having mounted within the same in telescopic relation a throttle, or fuel controlling, shaft 8, and a spark controlling shaft 9, both of which may extend to the steering wheel and be actuated in the usual manner.

The steering shaft 3 is provided within the casing with a pinion and, in the present instance, the pinion is formed by cutting the teeth in the inner portion of the shaft 3, as shown at 10. This pinion meshes with a gear 11 which is mounted on a shaft 12 supported by the end walls of the casing. Eccentrically mounted on the shaft 12 and spaced some distance apart are two disks, 13 and 14, which are preferably, but not necessarily, circular in shape and which are so connected with the gear 11 as to rotate therewith when rotatory movement is imparted to this gear by the steering shaft. In the present construction the gear 11 is rigidly mounted on a sleeve 15 which in turn is mounted on the shaft 12 and is keyed thereto so that it will be caused to rotate therewith but will be capable of axial movement thereon. The eccentric disk 13 is rigidly secured to the sleeve 15 for rotation therewith. As here shown, the sleeve 15 is mounted, between the gear and the disk 13, in a bearing 16 and the inner end of the sleeve, beyond the disk 13, extends a short distance into, and is journaled, in, a second bearing 17, both bearings being preferably formed integral with the main frame. The second disk 14 is also mounted on a sleeve, as shown at 18, and the inner end of this sleeve is journaled in the bearing 17 and normally spaced some distance from the end of the sleeve 15. The outer end of the sleeve 18 is journaled in a bearing 19 carried by and extending inwardly from the end wall of the casing 1. The sleeve 18 is splined to the shaft 12 so that it will be caused to rotate therewith but may be moved axially thereon, thus permitting of the two disks being moved toward and from one another without affecting their annular relation one to the other. As will be noted, the axis about which the two disks rotate is arranged off center relatively to both disks and those portions of the two disks having the greatest radius are arranged diametrically opposite one another. Axial movement or longitudinal adjustment may be imparted to the sleeves, and the disks carried thereby, in any suitable manner but, as here shown, the ends of the shaft 12 are journaled in bearings 20 which are in the form of nuts screw threaded into bosses 21 on the respective ends of the casing and having heads 22 which can be gripped by a wrench or other suitable implement for rotating the nut. The inner ends of the bearings, or nuts, 20 engage the adjacent ends of the sleeves 15 and 18, respectively, so that when the nuts are rotated in a direction to cause them to move inwardly the sleeves will be forced toward one another. Obviously, either sleeve and its disk may be adjusted independently of the other sleeve and its disk.

A rock shaft 23 is journaled in the bearing formed in the main casing, extends transversely to the axis about which the disks 13 and 14 rotate, and has one end projecting some distance beyond the casing and adapted to be connected with the wheels which are to be steered. In the present instance, a steering arm 24 is rigidly secured to the outer end of the rock shaft. Rigidly secured to the rock shaft 23 and, if desired, formed integral therewith, is a rock arm 25, the ends of which project on opposite sides of the rock shaft and are provided with parts adapted to engage the peripheries of the respective disks 13 and 14. Thus the rotation of the disks about their common axis will cause the rock arm 25 to move about its axis and will thus impart movement to the wheels which are to be steered in a direction and to an extent corresponding to the movement of the disks.

Preferably the mechanism is such that the disks can be adjusted to cause the same to have a firm working contact from the respective parts of the rock arm and to take up any wear which may result from the use of the mechanism. To this end the disks 13 and 14 are here shown as frusto conical in shape and have their smaller ends adjacent one to the other. The parts of the rock arm which engage the peripheries of the disks are also preferably adjustable so that they will automatically adjust themselves to maintain their faces in contact with the full width of the respective disks in all positions of the rock arm. To this end those parts of the arm which engage the disks are formed separate from the body of the arm and, in the present instance, they are shown in the form of blocks, 26, having their contact faces flat and having their bearing surfaces curved and fitting within the bearing recesses 27 in the respective ends of the arm 25, the blocks being held in these recesses by their contact with the disks. To hold the disks against longitudinal movement in their bearings, or seats, pins 28 are passed through the ends of the arms and their ends project into grooves 29 formed in the circumference of the blocks. It will be apparent that this construction permits the blocks to move freely about axes parallel with the axis about which the arm 25 rocks but holds the same against longitudinal displacement. Consequently, as the disks rotate, and the rock arm changes its position the bearing blocks 26 will shift their positions on their seats so as to maintain their contact surfaces in engagement with the peripheries or contact surfaces of the disks across the full width thereof. Because of the tapered shape of the disks and the fact that the faces of the bearing blocks must, therefore, extend at angles to the axis of the disks it will be apparent that the inward movement of the disks, due to the adjustment of the nuts 20, will cause the disks to move upwardly along the inclined faces of the bearing blocks and will thus take up any wear or lost motion between these parts and maintain the same in firm working engagement.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a steering mechanism, a supporting member, a pair of disks supported by said member for rotation about a common axis and arranged off center relatively to said axis, means for simultaneously rotating both disks, a shaft extending transversely to said axis and adapted to be connected with the wheels to be steered, an arm secured to said rock shaft and having parts on the opposite sides of its axis to engage the respective disks, and means for adjusting said disks relatively to said supporting member to maintain a firm engagement between the same and said parts of said arm.

2. In a steering mechanism, a pair of disks mounted for rotation about a common axis which is arranged off center relatively to both disks, means for simultaneously rotating both disks, a rock shaft extending transversely to said axis and adapted to be connected with the wheels to be steered, an arm secured to said rock shaft and having parts on the opposite sides of its axis to engage the respective disks, and means for axially adjusting said disks to maintain a firm engagement between the same and said parts of said arm.

3. In a steering mechanism, a pair of frusto conical disks mounted for rotation about a common axis which is arranged off center relatively to both disks, means for simultaneously rotating said disks, a rock shaft extending transversely to said axis and adapted to be connected with the wheels to be steered, an arm secured to said rock shaft and having parts on the opposite sides of its axis to engage the respective disks, said parts being adjustable to maintain their faces parallel with the contact surfaces of said disks, and means for axially adjusting said disks.

4. In a steering mechanism, a pair of frusto conical disks mounted for rotation about a common axis which is arranged off center relatively to both disks, means for simultaneously rotating said disks, a rock shaft extending transversely to said axis and adapted to be connected with the wheels to be steered, an arm secured to said rock shaft and having parts on the opposite sides of its axis to engage the respective disks, said parts being adjustable to maintain their faces parallel with the contact surfaces of said disks.

5. In a steering mechanism, a pair of disks mounted for rotation about a common axis which is arranged off center relatively to both disks, means for simultaneously rotating both disks, a rock shaft extending transversely to said axis and adapted to be connected with the wheels to be steered, an arm secured to said rock shaft, and contact blocks mounted on said arm on opposite sides of its axis and having contact surfaces to engage the peripheries of the respective disks, said blocks being movable about axes parallel with the axis of said arm.

6. In a steering mechanism, a pair of disks mounted for rotation about a common axis which is arranged off center relatively to both disks, means for simultaneously rotating both disks, a rock shaft extending transversely to said axis and adapted to be connected with the wheels to be steered, an arm secured to said rock shaft and having bearings on opposite sides of its axis, contact blocks having curved bearing surfaces mounted in the respective bearings in said arm and having contact faces to engage the peripheries of the respective disks, and means for holding said contact blocks against longitudinal movement in said bearings.

7. In a steering mechanism, a shaft, means for imparting rotatory movement to said shaft, disks eccentrically mounted on said shaft for rotation therewith and for movement axially thereof, a rock shaft extending transversely to the first mentioned shaft, an arm secured to said rock shaft and having parts on the opposite sides of its axis to engage the peripheries of the respective disks, and means for imparting axial movement to said disks.

8. In a steering mechanism, a shaft, means for imparting rotatory movement to said shaft, disks eccentrically mounted on said shaft for rotation therewith and for movement axially of said shaft relatively one to the other, a rock shaft extending transversely to the first mentioned shaft, an arm secured to said rock shaft and having parts on the opposite sides of its axis to engage the peripheries of the respective disks, and means for adjusting each of said disks axially of said first mentioned shaft independently of the other disk.

9. In a steering mechanism, a main frame, a shaft journaled in said main frame, means for imparting rotatory movement to said shaft, sleeves mounted on said shaft for rotation therewith and for longitudinal movement thereon relatively one to the other, disks eccentrically mounted on the respective sleeves, means for adjusting said sleeves longitudinally of said shaft, a rock shaft extending transversely to the first mentioned shaft, and an arm secured to said rock shaft and having parts on the opposite sides of its axis to engage the peripheries of the respective disks, and means for adjusting said sleeves and said disks axially of said first mentioned shaft.

10. In a steering mechanism, a main frame, axially adjustable bearings carried by said main frame, a shaft journaled in said bearings, means for imparting rotatory movement of said shaft, sleeves mounted on said shaft for rotation therewith and for movement axially thereof, said casing having bearings for said sleeves, frusto conical disks rigidly secured to and arranged eccentrically of the respective sleeves, a rock shaft extending transversely to the first mentioned shaft, an arm secured to said rock shaft, and contact blocks mounted on said arm on opposite sides of its axis for adjustment about axes arranged parallel with said rock shaft, said blocks having flat contact faces to engage the peripheries of the respective disks, the outer ends of the respective sleeves being so arranged with relation to the respective bearings for the first mentioned shaft that the adjustment of these bearings will impart axial movement to the respective sleeves and the disks carried thereby.

11. In a steering mechanism, a pair of disks mounted for rotation about a common axis which is arranged off center relatively to both disks, means for simultaneously rotating said disks, a rock shaft extending transversely to said disks and adapted to be connected with the wheel to be steered, an arm secured to said rock shaft and having parts on the opposite sides of its axis to engage the respective disks, said parts being adjustable to maintain the faces parallel with the contact surfaces of said disks.

12. In a steering mechanism, a frame, a steering shaft journaled in said frame and having a pinion at its inner end, a second shaft journaled in said frame parallel with the said steering shaft, a gear secured to said second shaft for rotation therewith and meshing with said pinion, disks eccentrically mounted on said second shaft, a rock shaft extending transversely to said second shaft, an arm carried by said rock shaft and having parts on opposite sides of its axis to engage the respective disks, and means for adjusting said disks relatively to said second shaft.

13. In a steering mechanism, a frame, a steering shaft journaled in said frame and having a pinion at its inner end, a second shaft journaled in said frame parallel with said steering shaft, sleeves mounted on said second shaft for rotation therewith and capable of adjustment axially thereof, a gear secured to one of said sleeves and meshing with said pinion, disks eccentrically mounted on the respective sleeves, a rock shaft extending transversely to said second shaft, an arm carried by said rock shaft and having parts on the opposite sides of its axis to engage the respective disks, and means for adjusting said sleeves.

In testimony whereof I affix my signature hereto.

JOSEPH N. KELLY.